US010882628B2

(12) United States Patent
Abe et al.

(10) Patent No.: US 10,882,628 B2
(45) Date of Patent: Jan. 5, 2021

(54) DRONE WITH MAGNET FLUID SEALED BEARING UNIT AND DRIVE MOTOR HAVING THE BEARING UNIT

(71) Applicant: GLOBERIDE, Inc., Tokyo (JP)

(72) Inventors: Yutaro Abe, Tokyo (JP); Hiromu Yasuda, Tokyo (JP)

(73) Assignee: GLOBERIDE, Inc., Tokyo (JP)

(*) Notice: Subject to any disclaimer, the term of this patent is extended or adjusted under 35 U.S.C. 154(b) by 440 days.

(21) Appl. No.: 15/689,663

(22) Filed: Aug. 29, 2017

(65) Prior Publication Data
US 2018/0057180 A1 Mar. 1, 2018

(30) Foreign Application Priority Data

Aug. 31, 2016 (JP) ................................. 2016-169191

(51) Int. Cl.
*B64C 27/12* (2006.01)
*F16C 33/80* (2006.01)
(Continued)

(52) U.S. Cl.
CPC ............ *B64D 29/00* (2013.01); *B64C 39/024* (2013.01); *F16C 19/06* (2013.01); *F16C 33/765* (2013.01);
(Continued)

(58) Field of Classification Search
CPC .. B64C 2201/042; B64C 27/12; H02K 5/124; H02K 5/10; F16C 33/80
See application file for complete search history.

(56) References Cited

U.S. PATENT DOCUMENTS 1,639,684 A 8/1927 Bott
5,047,677 A * 9/1991 Mineta ..................... F16C 19/54
310/67 R
(Continued)

FOREIGN PATENT DOCUMENTS

CN 1215808 A 5/1999
CN 101244762 A 8/2008
(Continued)

OTHER PUBLICATIONS

Extended European Search Report EP Application No. 17188691.4 dated Feb. 2, 2018.
(Continued)

*Primary Examiner* — Brian M O'Hara
(74) *Attorney, Agent, or Firm* — DLA Piper LLP (US)

(57) ABSTRACT

One object is to provide a drone capable of achieving desired performance by preventing entry of foreign matter such as water droplets or dust particularly into a power portion thereof. A drone of the present invention is provided with a fixed section having a motor housing for housing a motor therein and a rotary section having a propeller shaft supported via a bearing so as to be rotatable with respect to the motor housing and configured to rotate integrally with the propeller. In an opposed portion where fixed-side components constituting the fixed section and rotary-side components constituting the rotary section are opposed to each other, there is provided a foreign matter entry prevention unit configured to prevent foreign matter from entering an inside of the motor housing.

9 Claims, 12 Drawing Sheets

(51) Int. Cl.
    *B64D 29/00*     (2006.01)
    *F16C 33/76*     (2006.01)
    *F16C 33/78*     (2006.01)
    *B64C 39/02*     (2006.01)
    *F16C 19/06*     (2006.01)
    *H02K 5/124*     (2006.01)

(52) U.S. Cl.
    CPC ........ *F16C 33/768* (2013.01); *F16C 33/7846* (2013.01); *F16C 33/7886* (2013.01); *F16C 33/80* (2013.01); *F16C 33/805* (2013.01); *H02K 5/124* (2013.01); *B64C 2201/024* (2013.01); *B64C 2201/042* (2013.01); *B64C 2201/108* (2013.01); *B64C 2201/146* (2013.01); *F16C 2326/43* (2013.01)

(56) References Cited

U.S. PATENT DOCUMENTS

| | | | | |
|---|---|---|---|---|
| 5,325,004 | A * | 6/1994 | Mori | ............... F16J 15/43 |
| | | | | 310/67 R |
| 5,482,378 | A | 1/1996 | Vona, Jr. et al. | |
| 5,572,078 | A * | 11/1996 | Saichi | ............... H02K 5/124 |
| | | | | 310/44 |
| 10,315,762 | B2 * | 6/2019 | Diez-Garias | ........... B63G 8/001 |
| 2013/0127284 | A1 | 5/2013 | Hamann et al. | |
| 2013/0193647 | A1 | 8/2013 | Honda | |
| 2015/0093272 | A1 * | 4/2015 | Komer | ............... B64C 11/38 |
| | | | | 417/423.1 |
| 2015/0122930 | A1 | 5/2015 | Ohara | |
| 2015/0372567 | A1 | 12/2015 | Kamiya | |
| 2016/0032979 | A1 | 2/2016 | Nagata et al. | |
| 2017/0210464 | A1 * | 7/2017 | Haley | ............... B64C 27/14 |
| 2017/0233073 | A1 * | 8/2017 | Ao | ............... B64C 39/024 |
| | | | | 454/184 |

FOREIGN PATENT DOCUMENTS

| | | | |
|---|---|---|---|
| CN | 103180643 | A | 6/2013 |
| CN | 103842675 | A | 6/2014 |
| CN | 104527974 | A | 4/2015 |
| CN | 105173063 | A | 12/2015 |
| DE | 20304998 | U1 | 8/2003 |
| EP | 2413482 | A1 | 2/2012 |
| EP | 2979545 | A2 | 2/2016 |
| FR | 2238321 | A5 | 2/1975 |
| JP | 2002-339995 | A | 11/2002 |
| JP | 2004-360852 | A | 12/2004 |
| JP | 2006-334422 | A | 12/2006 |
| JP | 2015-010674 | A | 1/2015 |
| JP | 2016-10204 | A | 1/2016 |
| JP | 2016-101104 | A | 6/2016 |
| JP | 2016-162571 | A | 6/2016 |
| WO | WO-2018029741 | A1 * | 2/2018 ............... H02K 5/10 |

OTHER PUBLICATIONS

Notice of Reasons for Rejection dated Oct. 3, 2019, of counterpart Japanese Application No. 2016-169191, along with an English translation.

First Office Action dated Apr. 26, 2020, of counterpart Chinese Application No. 201710680107.9, along with an English translation.

* cited by examiner

DRONE WITH MAGNET FLUID SEALED BEARING UNIT AND DRIVE MOTOR HAVING THE BEARING UNIT

CROSS-REFERENCE TO RELATED APPLICATIONS

This application is based on and claims the benefit of priority from Japanese Patent Application Serial No. 2016-169191 (filed on Aug. 31, 2016), the contents of which are hereby incorporated by reference in their entirety.

TECHNICAL FIELD

The present invention relates to a drone remotely operated.

BACKGROUND

Conventionally, there is widely known a remotely operated drone as a toy or for industrial use (see, for example, Japanese Patent Application Publication No. 2006-334422).

In recent years, such a drone has been receiving attention for its excellent maneuverability particularly in industrial applications. The drone can be used, for example, to spray pesticide from the air, or when equipped with a camera, to obtain information on an area humans cannot enter by taking pictures or shooting videos of that area from above, and also to transport goods.

Such a drone typically flies outdoors and thus is often exposed to rain, a plume of dust raised by the drone itself, a spray of water, or the like. Despite this, as a result of pursuing a simplified structure, the drone is generally vulnerable to water droplets or dust entering from outside.

A conventional type of drone, in particular, has a configuration insufficient in preventing dust or water from entering a motor housing that houses therein a motor for driving a propeller to rotate. Because of this, due to entry of foreign matter such as water droplets or dust into the motor housing (particularly, into a power portion such as a motor or a gearbox), the drone might fail to deliver desired performance.

SUMMARY

The present invention is intended to overcome the above-described problem and has as its object to provide a drone capable of achieving desired performance by preventing entry of foreign matter such as water droplets or dust particularly into a power portion thereof.

In order to achieve the above-described object, the present invention provides a drone characterized by including a drive portion having a propeller, which is attached to a body, the drone being configured to fly by driving a motor to rotate the propeller. The drone is provided with a fixed section having a housing for housing therein the motor and/or a speed reducer, a rotary section having a propeller shaft, the rotary shaft being supported via a bearing so as to be rotatable with respect to the housing, the rotary section being configured to rotate integrally with the propeller, and a foreign matter entry prevention unit configured to prevent foreign matter from entering an inside of the housing, the foreign matter entry prevention unit being provided in an opposed portion where fixed-side components constituting the fixed section and rotary-side components constituting the rotary section are opposed to each other.

According to the above-described configuration, the foreign matter entry prevention unit configured to prevent foreign matter from entering the inside of the housing is provided in the opposed portion where the fixed-side components and the rotary-side components are opposed to each other, which can form a passage for entry of foreign matter into the housing. It is, therefore, possible to effectively prevent entry of foreign matter such as water droplets or dust particularly into a power portion in the housing, and thus desired performance of the drone can be achieved.

In the above-described configuration, it may also be possible that the foreign matter entry prevention unit is formed of a magnetic seal mechanism inserted in the opposed portion or formed by configuring the bearing as a magnetic seal mechanism-equipped bearing. According to this configuration, a gap formed in the opposed portion is magnetically sealed with reliability, and thus compared with a conventional configuration, a water-proof property and a dust-proof property can be significantly improved. Furthermore, a magnetic seal is positioned in the opposed portion (or within the bearing) without being exposed to outside, and thus a life of the magnetic seal mechanism is also prolonged.

Furthermore, in the above-described configuration, it may also be possible that the foreign matter entry prevention unit is formed of an elastic seal member inserted in the opposed portion. In this case, it is also conceivable to form the elastic seal member by using a rubber material. Also in such a case, the rubber material is positioned in the opposed portion without being exposed to outside, and thus ultraviolet-induced deterioration of the elastic seal member can be suppressed. Furthermore, in this case, preferably, the elastic seal member is subjected to a water-repellent treatment. With such a water-repellent treatment applied, even when a minute gap is present in the opposed portion, a water beading action brought about by the water-repellent treatment can effectively suppress water entry thereinto, so that a water-proof property can be improved. Furthermore, a water-repellent effect makes it possible to permit a slight clearance to be left in the opposed portion, while achieving desired water-proof performance, and thus a reduction in torque loss can also be achieved by providing such a clearance.

Furthermore, in the above-described configuration, it may also be possible that the foreign matter entry prevention unit is formed in a labyrinth structure formed by alternately and continuously providing a plurality of opposed portions in each of which the fixed-side components and the rotary-side components are opposed to each other in a radial direction of the drive portion and a plurality of opposed portions in each of which the fixed-side components and the rotary-side components are opposed to each other in an axial direction of the drive portion. With such a labyrinth structure, water-proof and dust-proof performance can be achieved without the need to newly provide a separate member such as a seal mechanism, and thus weight reduction, a simplified structure, and so on can be realized.

Furthermore, in the above-described configuration, it may also be possible that the foreign matter entry prevention unit is formed of an airflow generation unit provided in the rotary-side components and configured to generate, as the propeller rotates, an airflow in the opposed portion, which is directed in a direction reverse to an entry direction of foreign matter. According to the airflow generation unit, a foreign matter elimination effect can be obtained by directly utilizing a rotation action of the propeller. Thus, water-proof and dust-proof performance can be efficiently achieved, and a simplified structure can be also achieved, while foreign matter entering the opposed portion is actively eliminated by an airflow, and thus it is possible to reliably prevent foreign matter from entering the power portion in the housing.

Furthermore, in the above-described configuration, preferably, the propeller has a blade portion configured to rotate in a horizontal plane or a vertical plane and a cover portion provided separately from the blade portion and opposed to the fixed-side components. By this configuration, the blade portion and the cover portion can be formed by using different materials from each other, thus making it possible to achieve weight reduction, ease in molding, and so on.

Furthermore, in the above-described configuration, preferably, the fixed-side components and the rotary-side components forming the opposed portion are subjected to a water-repellent treatment. With such a water-repellent treatment applied, even when a minute gap is present in the opposed portion, a water beading action brought about by the water-repellent treatment can effectively suppress water entry thereinto, so that a water-proof property can be improved. Furthermore, a water-repellent effect makes it possible to permit a slight clearance to be left in the opposed portion, while achieving desired water-proof performance, and thus a reduction in torque loss can also be achieved by providing such a clearance.

Advantages

According to the present invention, there can be obtained a drone capable of achieving desired performance by preventing entry of foreign matter such as water droplets or dust particularly into a power portion thereof.

DESCRIPTION OF THE PREFERRED EMBODIMENTS

With reference to the appended drawings, the following specifically describes an embodiment of a drone according to the present invention. In this specification, a "drone" may refer to a flying object remotely operable without a human on board operating the flying object, examples of which include a multicopter having a plurality of propellers. Specifically, it may be a concept subsuming all of a tricopter having three propellers, a quadcopter having four propellers, a pentacopter having five propellers, a hexacopter having six propellers, an octocopter having eight propellers, and so on. Thus, while the following description may use a quadcopter as one example for the sake of convenience of explanation, the present invention may not be limited thereto and be applied to any form of drone having any number of propellers.

Figure 1:
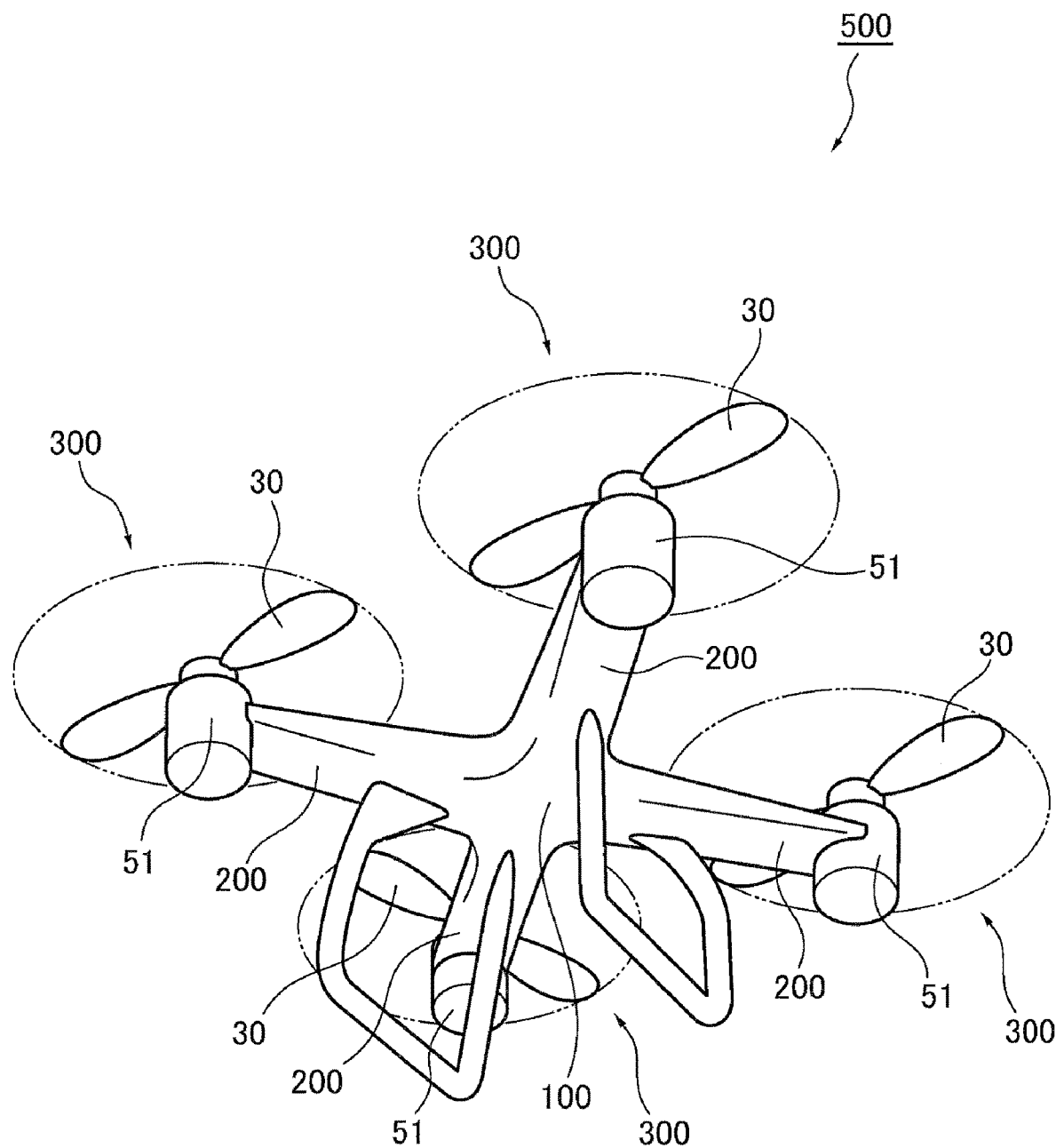
FIG. 1 is a schematic perspective view of a drone according to one embodiment of the present invention.

FIG. 1 shows a drone 500 as a quadcopter according to one embodiment of the present invention. As shown in the figure, a drone 500 according to this embodiment may have four frame portions (body) 200 extending radially from a main body portion 100 at a center, and a drive portion 300 may be mounted to a distal end of each of the frame portions 200. In this case, the main body portion 100 may be provided with, for example, a battery, a control portion, a communication portion (a signal transmission and reception portion), a sensor, and a camera (none of these is shown). Furthermore, the drive portion 300 may have a motor housing 51 housing a drive motor 50 (see after-mentioned FIG. 3) therein and a propeller 30 driven to rotate by the drive motor 50. That is, the drone 500 according to this embodiment may be provided with the drive portion 300 having the propeller 30, and can fly by driving the drive motor 50 to rotate the propeller 30.

Figure 2:
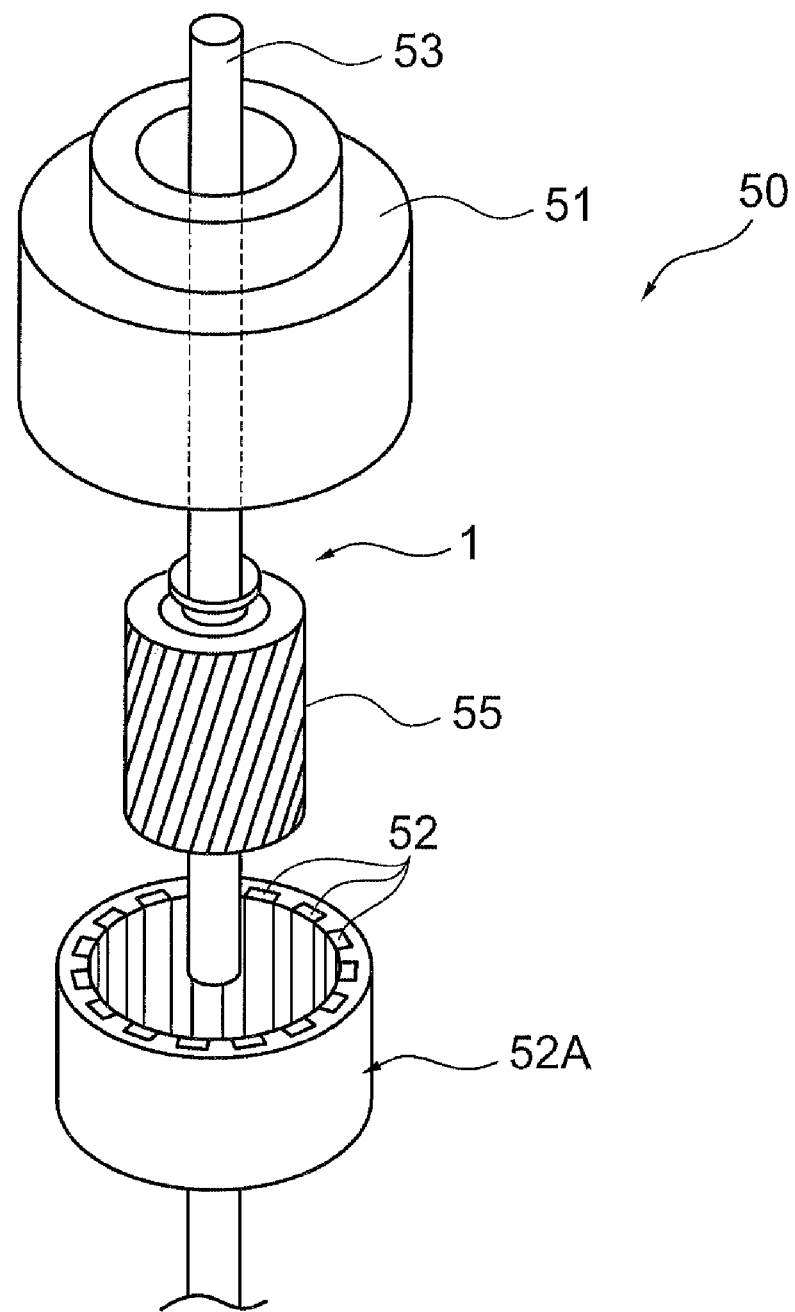
FIG. 2 is a schematic perspective view showing one configuration example of a drive motor for driving a propeller to rotate in the drone shown in FIG. 1.
Figure 3:
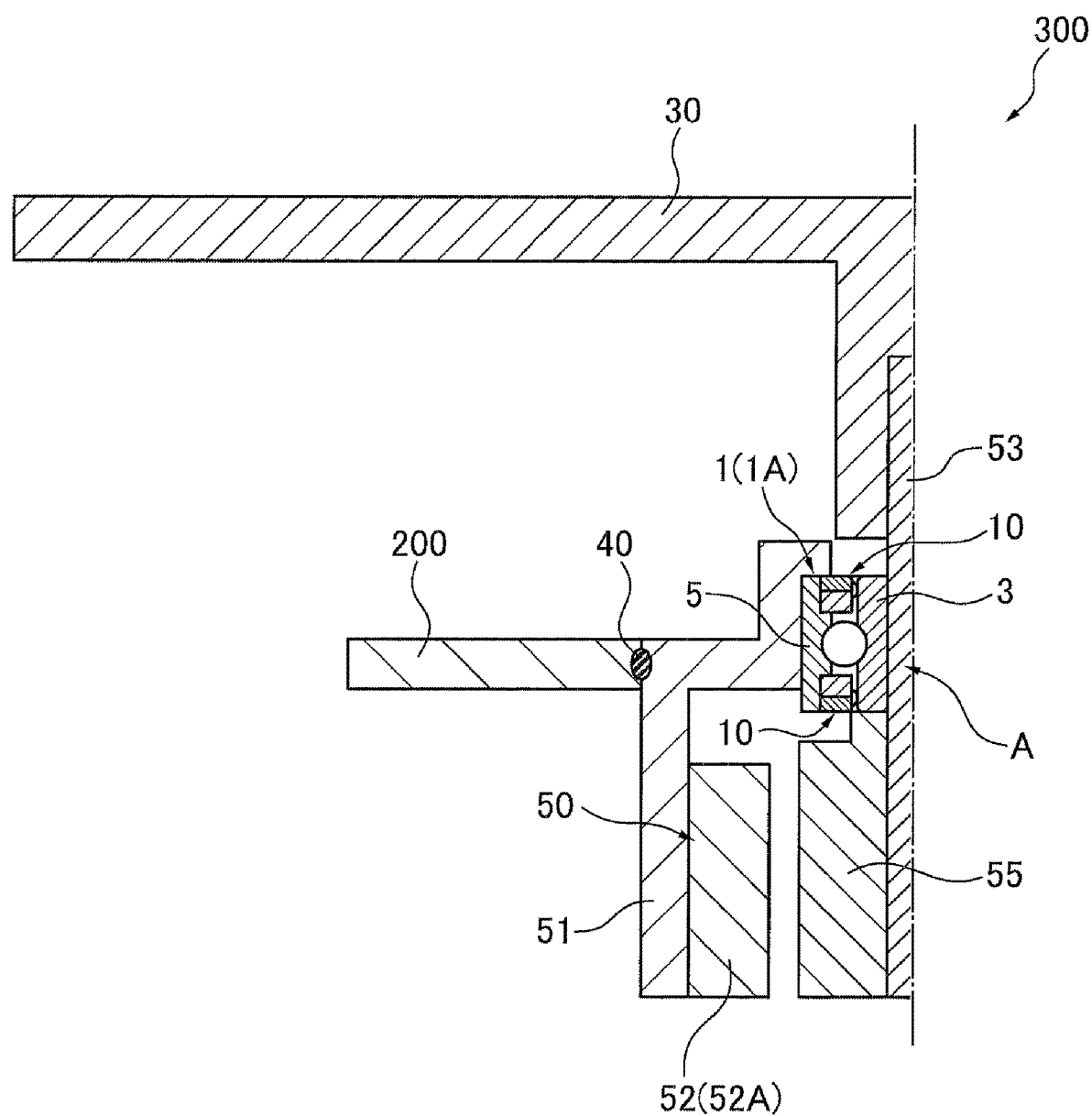
FIG. 3 is a schematic half sectional view of a first example of a drive portion having the propeller in the drone shown in FIG. 1.

Furthermore, FIG. 2 shows a schematic perspective view illustrating one configuration example of the drive motor 50, and FIG. 3 shows a schematic half sectional view of a first example of the drive portion 300. As shown in these figures, the drive motor 50 may be housed in the motor housing 51 as mentioned above and include, as components thereof, a plurality of bar-shaped magnets 52, a rotor 55 having a propeller shaft (a rotary shaft) 53 mounted therethrough so as to be rotatable integrally therewith and driven to rotate by an electromagnetic action between itself and the magnets 52, and a bearing 1 for supporting the propeller shaft 53 rotatably with respect to the motor housing 51.

The magnets 52 may be mounted, as a stator 52A (a permanent magnet type stator), on an inner surface of the motor housing 51 (see FIG. 3), and the rotor 55 with a wire (a coil) wound thereon may be arranged on an inner side of the magnets 52. The propeller shaft 53 may be mounted in a center portion of the rotor 55 and driven to rotate, together with the rotor 55, by an electromagnetic action between the magnets 52 and the rotor 55, thus causing rotation of the propeller 30 mounted to the propeller shaft 53 so as to be rotatable integrally therewith.

Furthermore, the done 500 as a whole may be divided into a non-rotatable fixed-side section (a fixed section) extending from the motor housing 51 up to the frame portion 200 and the main body portion 100 and an integrally rotatable rotary-side section (a rotary section) having the propeller shaft 53, the rotor 55, and the propeller 30 mounted via the bearing 1 so as to be rotatable with respect to the motor housing 51. In other words, the fixed-side section may have, each as a fixed-side component thereof, at least the motor housing 51, the frame portion 200, and the main body portion 100, and the rotary-side section may have, each as a rotary-side component thereof, at least the propeller shaft 53, the rotor 55, and the propeller 30. Further, the drone 500 may have an opposed portion where the fixed-side components and the rotary-side components are opposed to each other, and particularly in the first example of the drive portion 300 shown in FIG. 3, the drone 500 may have an opposed portion A where the motor housing 51 and the propeller shaft 53 are opposed to each other.

Furthermore, in the first example, in the opposed portion A, there may be provided a foreign matter entry prevention unit configured to prevent foreign matter from entering an inside of the motor housing 51. Specifically, in the first example, the foreign matter entry prevention unit may be formed by configuring the bearing 1 as a magnetic seal mechanism-equipped bearing 1A. The magnetic seal mechanism-equipped bearing 1A may have a configuration in which a magnetic seal mechanism is built into a bearing main body. Furthermore, the magnetic seal mechanism built into the bearing main body may have a configuration in which a ring-shaped magnet is mounted on an outer peripheral surface of an inner ring of the bearing main body or an inner peripheral surface of an outer ring of the bearing main body as a fixed side, thus forming a magnetic circuit, and a magnetic fluid is retained in a gap on an opposite side (a gap on the inner peripheral surface of the outer ring or a gap on the outer peripheral surface of the inner ring) so as to prevent foreign matter from entering rolling members.

Figure 4:
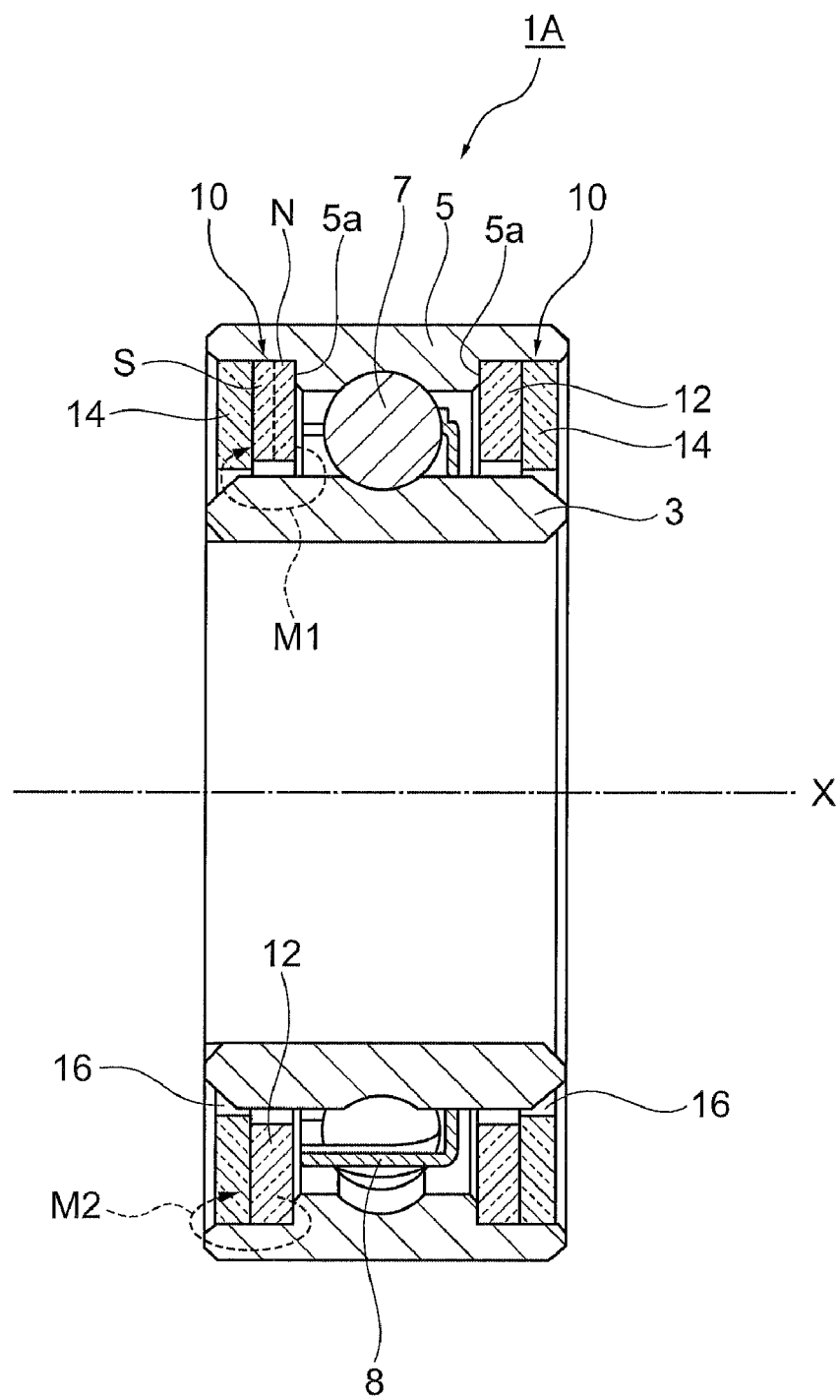
FIG. 4 is a sectional view of a magnetic seal mechanism-equipped bearing provided in the drive portion shown in FIG. 3.
Figure 5A:
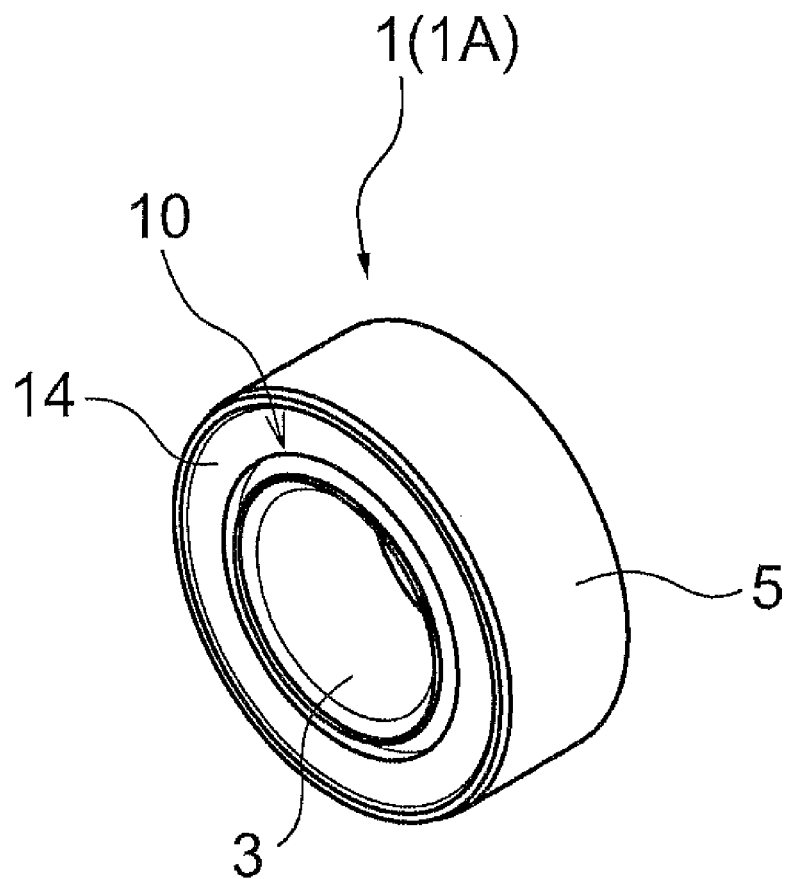
FIG. 5a is a perspective view of the magnetic seal mechanism-equipped bearing shown in FIG. 4.
Figure 5B:
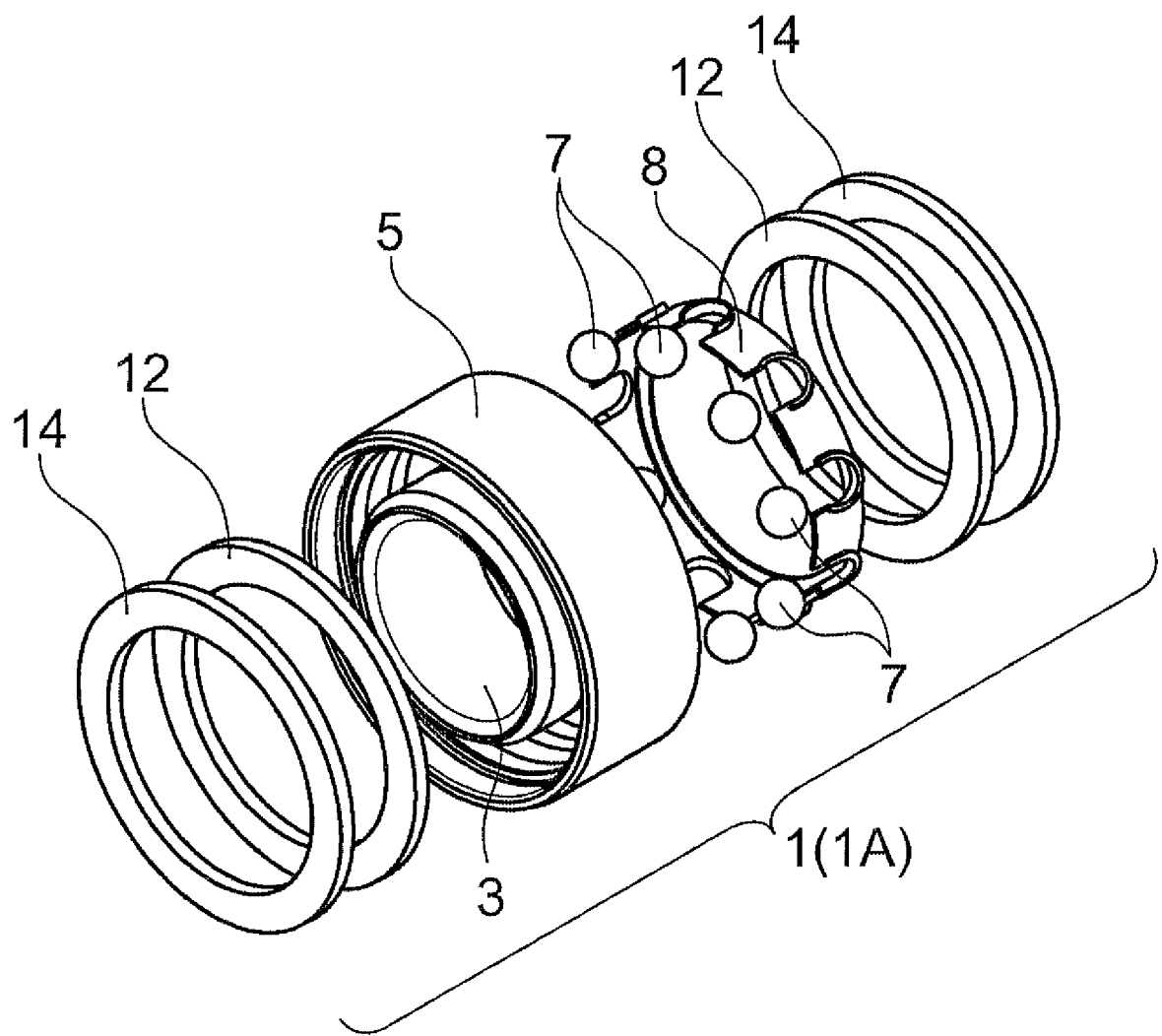
FIG. 5b is an exploded perspective view of the magnetic seal mechanism-equipped bearing shown in FIG. 4.

As shown in FIG. 4 and FIGS. 5a and 5b, the magnetic seal mechanism-equipped bearing 1A may include a cylindrical inner ring 3, a cylindrical outer ring 5 encircling the inner ring 3, a plurality of rolling members (rolling elements) 7 interposed between the inner ring 3 and the outer ring 5. The rolling members 7 may be retained by an annularly shaped retainer (a retaining member) 8 and allow the inner ring 3 and the outer ring 5 to rotate relative to each other.

The inner ring 3, the outer ring 5, and the rolling members 7 may be made of a material having magnetism such as, for example, chrome-based stainless steel (SUS440C), and the retainer 8 may be made of a highly corrosion-resistant and heat-resistant material such as, for example, a stainless steel material (SUS304). The rolling members 7 may not be necessarily required to be magnetic bodies. Furthermore, the inner ring 3 and the outer ring 5 may be configured to be equal (or it may also be possible that they are substantially equal) in length in an axial direction (a direction of an axial center of a bearing) X. It may also be possible, however, that the outer ring 5 is elongated in the axial direction X with respect to the inner ring 3, or the inner ring 3 is elongated in the axial direction X with respect to the outer ring 5, in which case a magnetic seal mechanism described below is provided in an elongated portion thus formed.

On each of opening sides of the inner ring 3 and the outer ring 5, a magnetic seal mechanism (a magnetic fluid seal) 10 may be installed that inhibits entry of foreign matter toward the plurality of rolling members 7. While in this example, the magnetic seal mechanisms 10 having the same configuration may be arranged at openings on both sides of the inner ring 3 and the outer ring 5, respectively, it may also be possible that such a magnetic seal mechanism is arranged only at one of the openings on the both sides, or magnetic seal mechanisms having different configurations from each other are arranged on the both opening sides, respectively.

The magnetic seal mechanism 10 may have a ring-shaped magnet (hereinafter, referred to also as a "magnet") 12, a ring-shaped pole plate (hereinafter, referred to also as a "pole plate") 14 having the magnet 12 attached to an axially inner side surface thereof, and a magnetic fluid 16 retained by a magnetic circuit formed by the magnet 12. In this example, with an inner peripheral surface of the outer ring 5 set as a fixed side, the magnet 12 and the pole plate 14 may form a predetermined gap between themselves and an outer peripheral surface of the inner ring 3. That is, the predetermined gap may be formed between the outer peripheral surface of the inner ring 3 and the magnet 12 together with the pole plate 14, and the magnetic fluid 16 may be filled in this gap portion, so that there is provided a sealing capability of preventing foreign matter from entering the rolling members 7.

As the magnet 12, there can be used a permanent magnet having a high magnetic flux density and high magnetism, such as, for example, a neodymium magnet prepared by sintering. The magnet 12 may be magnetized beforehand such that magnetic poles (an S-pole, an N-pole) thereof point to the axial direction (the direction of the axial center of the bearing) X (FIG. 4 shows how the magnet 12 of the magnetic seal mechanism 10 on a left side is magnetized). Furthermore, on an axially outer side surface of the magnet 12, the pole plate 14 may be arranged so as to be in contact with the magnet 12. The pole plate 14 may have a ring-shaped outer appearance shape that is substantially the same as the shape of the magnet 12 and may be made of a material having magnetism such as, for example, chrome-based stainless steel (SUS440C). By this configuration, a magnetic circuit M1 as shown in the figure may be formed near the inner ring 3, and a magnetic circuit M2 as shown in the figure may be formed near the outer ring 5.

The magnetic fluid 16 retained by each of the magnetic circuits M1 and M2 may be prepared by dispersing magnetic fine particles of, for example, Fe3O4 in base oil using a surfactant and thus have viscosity and a property of reacting with a magnet when brought close thereto. That is, the magnetic fluid 16 thus described may be retained in the gap portion between the inner ring 3 and the magnet 12 together with the pole plate 14 to seal the gap, so that there is provided a capability of preventing foreign matter from entering inside. In this case, such a magnetic circuit formed by the magnet 12 may be formed also near the outer ring 5 as described above, and thus it may also be possible that the magnetic fluid 16 is previously filled in a minute gap between the inner peripheral surface of the outer ring 5 and the magnet 12.

Furthermore, a step 5a may be formed on the inner peripheral surface of the outer ring 5 near the rolling members 7. Due to the presence of the step 5a, the outer ring 5 may include thin regions on the opening sides and a thick region near the rolling members 7, so that a distance between the inner ring 3 and the outer ring 5 is larger on axially outer sides than on an axially inner side. The step 5a may have a capability of positioning and fixing the magnet 12 (the magnet 12 to which the pole plate 14 is attached; a pole plate formed into a unit together with a magnet) as the magnet 12 is inserted (fitted) from each of the opening sides so as to be mounted to a predetermined position and abuts against the step 5a.

The pole plate 14 may be attached to the magnet 12 so that a uniform gap is generated over an entire circumference between itself and the outer peripheral surface of the inner ring 3. In this case, the pole plate 14 may be formed to have such a size as to protrude in a radially inner side with respect to an inner ring-side edge surface of the magnet 12, and the magnet 12 may be formed so that, in a state where the magnet 12 is attached to the pole plate 14, a gap substantially equal in size to the above-described gap is generated between itself and the outer peripheral surface of the inner ring 3. When filled in the gap by using an injection tool such as a syringe, the magnetic fluid 16 may be retained over the entire circumference due to a magnetic force of each of the magnetic circuits M1 and M2. It may also be possible that the magnet 12 and the pole plate 14 are fixed by magnetic attraction or via an adhesive in combination with magnetic attraction.

Furthermore, in this example, as shown in FIG. 3, a seal member 40 such as an O ring may also be inserted between each of the frame portions 200 and the motor housing 51.

As described thus far, according to the first example, the foreign matter entry prevention unit 1A configured to prevent foreign matter from entering the inside of the motor housing 51 may be provided in the opposed portion A where the motor housing 51 (the fixed-side component) and the propeller shaft 53 (the rotary-side component) are opposed to each other, which can form a passage for entry of foreign matter into the motor housing 51. It is, therefore, possible to effectively prevent entry of foreign matter such as water droplets or dust particularly into a power portion (the drive motor 50) in the motor housing 51, and thus desired performance of the drone 500 can be achieved. Particularly in this example, the foreign matter entry prevention unit may be formed by configuring the bearing 1 as the magnetic seal mechanism-equipped bearing 1A, and thus a gap formed in the opposed portion A may be magnetically sealed with reliability, so that compared with a conventional configuration, a water-proof property and a dust-proof property can be dramatically improved. Furthermore, the magnetic seal mechanism-equipped bearing 1A may be positioned in the opposed portion A (within the bearing) without being exposed to outside, and thus a life of the magnetic seal mechanism-equipped bearing 1A (the magnetic seal mechanism 10) may be also prolonged.

Figure 6:
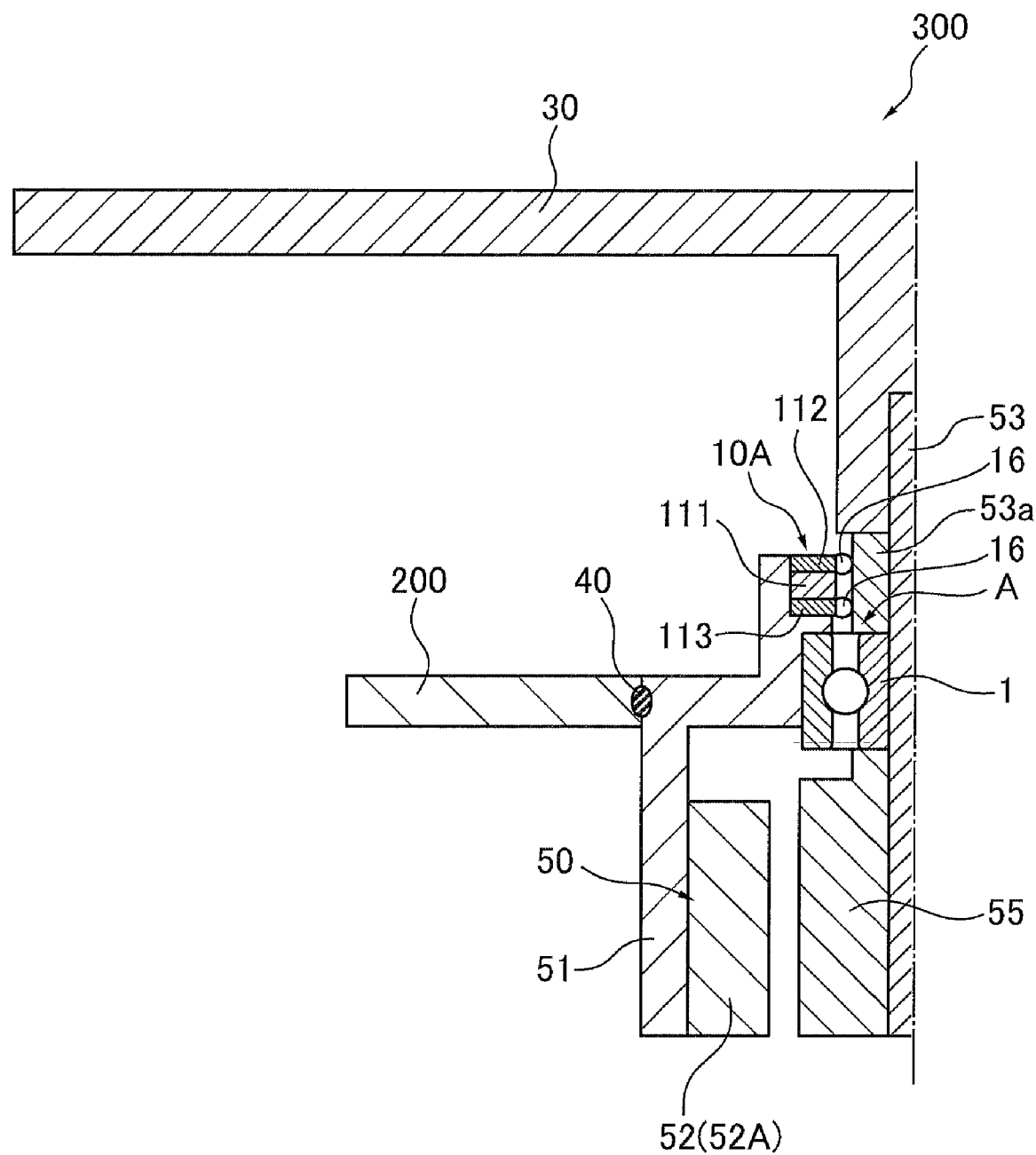
FIG. 6 is a schematic half sectional view of a second example of the drive portion having the propeller in the drone shown in FIG. 1.

FIG. 6 is a schematic half sectional view of a second example of the drive portion 300. As shown in the figure, in the second example, a foreign matter entry prevention unit configured to prevent foreign matter from entering an inside of the motor housing 51 may be formed of a magnetic seal mechanism 10A inserted in the opposed portion A between the motor housing 51 (the fixed-side component) and the propeller shaft 53 (the rotary-side component). Thus, in this example, unlike in the above-mentioned first example, the bearing 1 may be merely a ball bearing that does not have the magnetic seal mechanism 10 (needless to say, it may also be possible that the magnetic seal mechanism-equipped bearing 1A is used as the bearing 1).

The magnetic seal mechanism 10A constituting the foreign matter entry prevention unit may be positioned so as to seal, from outside, the bearing 1 disposed on an inner side of the motor housing 51. Specifically, the magnetic seal mechanism 10A may be configured to form a magnetic circuit between itself and a metal body 53a (for example, a piece of iron) provided integrally with or separately from the propeller shaft 53 and use the magnetic circuit to retain the magnetic fluid 16, thus preventing entry of foreign matter toward the bearing 1.

More specifically, the magnetic seal mechanism 10A may have a magnet 111 disposed with an annular gap provided with respect to the metal body 53a (or the propeller shaft 53) and ring-shaped retaining members (magnetic pole plates formed of magnetic bodies) 112 and 113 that retain the magnet 111 therebetween, thus forming a magnetic circuit between the metal body 53a and the retaining members 112 and 113.

In other respects, this example may be configured in the same way as the first example shown in FIG. 3. Thus, the foreign matter entry prevention unit of the second example (the magnetic seal mechanism 10A) may also have the same effect (of preventing entry of foreign matter) as that of the first example.

Figure 7:
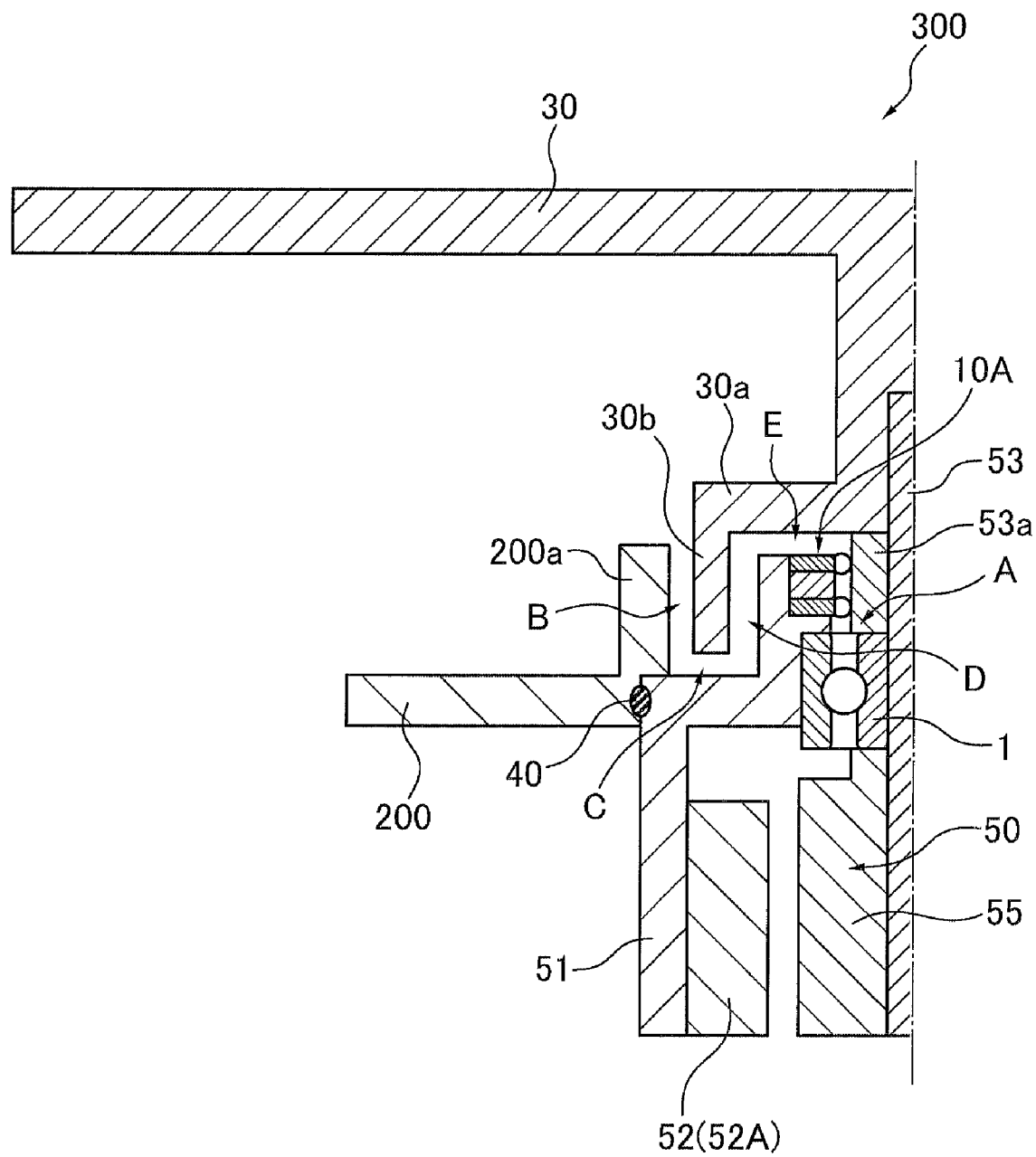
FIG. 7 is a schematic half sectional view of a third example of the drive portion having the propeller in the drone shown in FIG. 1.

FIG. 7 is a schematic half sectional view of a third example of the drive portion 300. As shown in the figure, the third example may have, in addition to the configuration of the second example, a labyrinth structure as another form of foreign matter entry prevention unit. Specifically, the labyrinth structure may be configured by alternately and continuously providing a plurality of opposed portions in each of which components are opposed to each other in a radial direction of the drive portion 300 and a plurality of opposed portions in each of which components are opposed to each other in an axial direction of the drive portion 300.

That is, as shown in FIG. 7, each of the frame portions 200 may have an axially extending portion 200a provided at a connection point between itself and the motor housing 51 and extending in the axial direction of the drive portion 300. Further, the propeller 30 may have a radially extending portion 30a extending in the radial direction of the drive portion 300 along the motor housing 51 from a vicinity of a connection point between itself and the propeller shaft 53 and an axially extending portion 30b extending in the axial direction of the drive portion 300 from a distal end of the axially extending portion 30a further between the axially extending portion 200a of the each of the frame portions 200 and the motor housing 51. Thus, in the drive portion 300, in addition to the above-mentioned (first) opposed portion A, there may be provided a second opposed portion B where the axially extending portion 200a of the each of the frame portions 200 and the axially extending portion 30b of the propeller 30 are opposed to each other in the radial direction, a third opposed portion C where the axially extending portion 30b of the propeller 30 and the motor housing 51 are opposed to each other in the axial direction, a fourth opposed portion D where the axially extending portion 30b of the propeller 30 and the motor housing 51 are opposed to each other in the radial direction, and a fifth opposed portion E where the axially extending portion 30a of the propeller 30 and the motor housing 51 are opposed to each other in the axial direction. The opposed portions B, C, D, and E may form the labyrinth structure as the foreign matter entry prevention unit.

In this manner, a portion that can form a passage for entry of foreign matter into the motor housing 51 may be formed in the labyrinth structure, and thus entry of foreign matter can be effectively prevented. Furthermore, with the labyrinth structure described above, water-proof and dust-proof performance can be achieved without the need to newly provide a separate member such as a seal mechanism, and thus weight reduction, a simplified structure, and so on can be realized.

Figure 8:
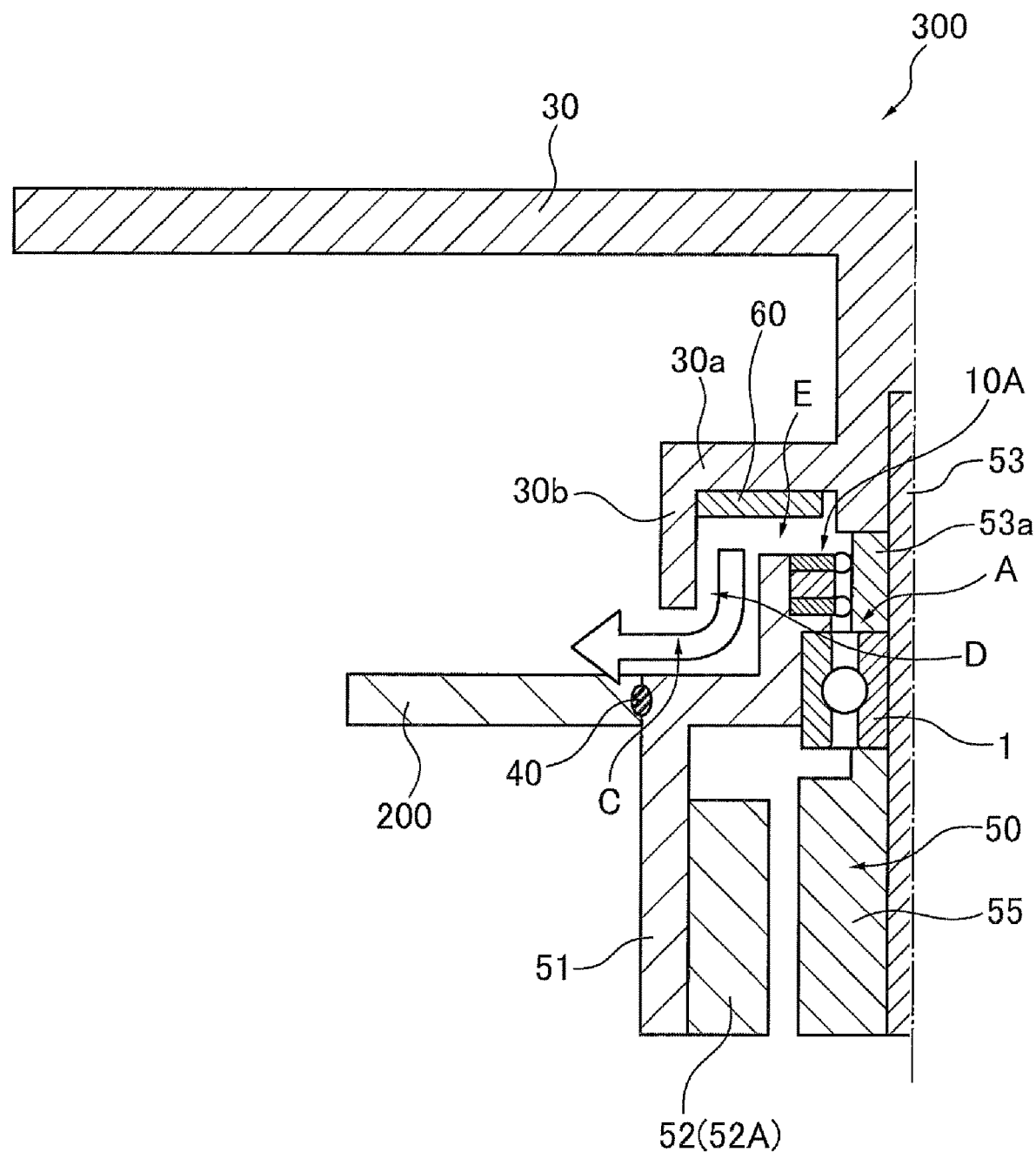
FIG. 8 is a schematic half sectional view of a fourth example of the drive portion having the propeller in the drone shown in FIG. 1.

FIG. 8 is a schematic half sectional view of a fourth example of the drive portion 300. As shown in the figure, the fourth example may have, in addition to the configuration of the second example, the axially extending portion 30a and the axially extending portion 30b of the propeller 30 in the third example (and hence may have the opposed portions C, D, and E in addition to the opposed portion A), and it may also have an airflow generation unit 60 as yet another form of foreign matter entry prevention unit.

As shown in the figure, the airflow generation unit 60 may be provided on any rotary-side component, and in this example, it may be provided on an inner surface of the radially extending portion 30a of the propeller 30, which is opposed to the motor housing 51 (hence in the fifth opposed portion E), as one example and configured to generate, as the propeller 30 rotates, an airflow (indicated by an arrow in FIG. 8) in the opposed portions C, D, and E, which is directed in a direction reverse to an entry direction of foreign matter.

Conceivably, the airflow generation unit 60 described above may be configured by forming an airfoil type irregularly shaped portion on the inner surface of the radially extending portion 30a or by providing a driven rotary body (such as a fan) that rotates as the propeller 30 rotates.

According to the airflow generation unit 60 described above, a foreign matter elimination effect can be obtained by directly utilizing a rotation action of the propeller 30. Thus, a water-proof and dust-proof performance can be efficiently achieved, and a simplified structure can be also achieved, while foreign matter entering the opposed portions C, D, and E is actively eliminated by an airflow, and thus it is possible to reliably prevent foreign matter from entering the power portion in the motor housing 51.

Figure 9:
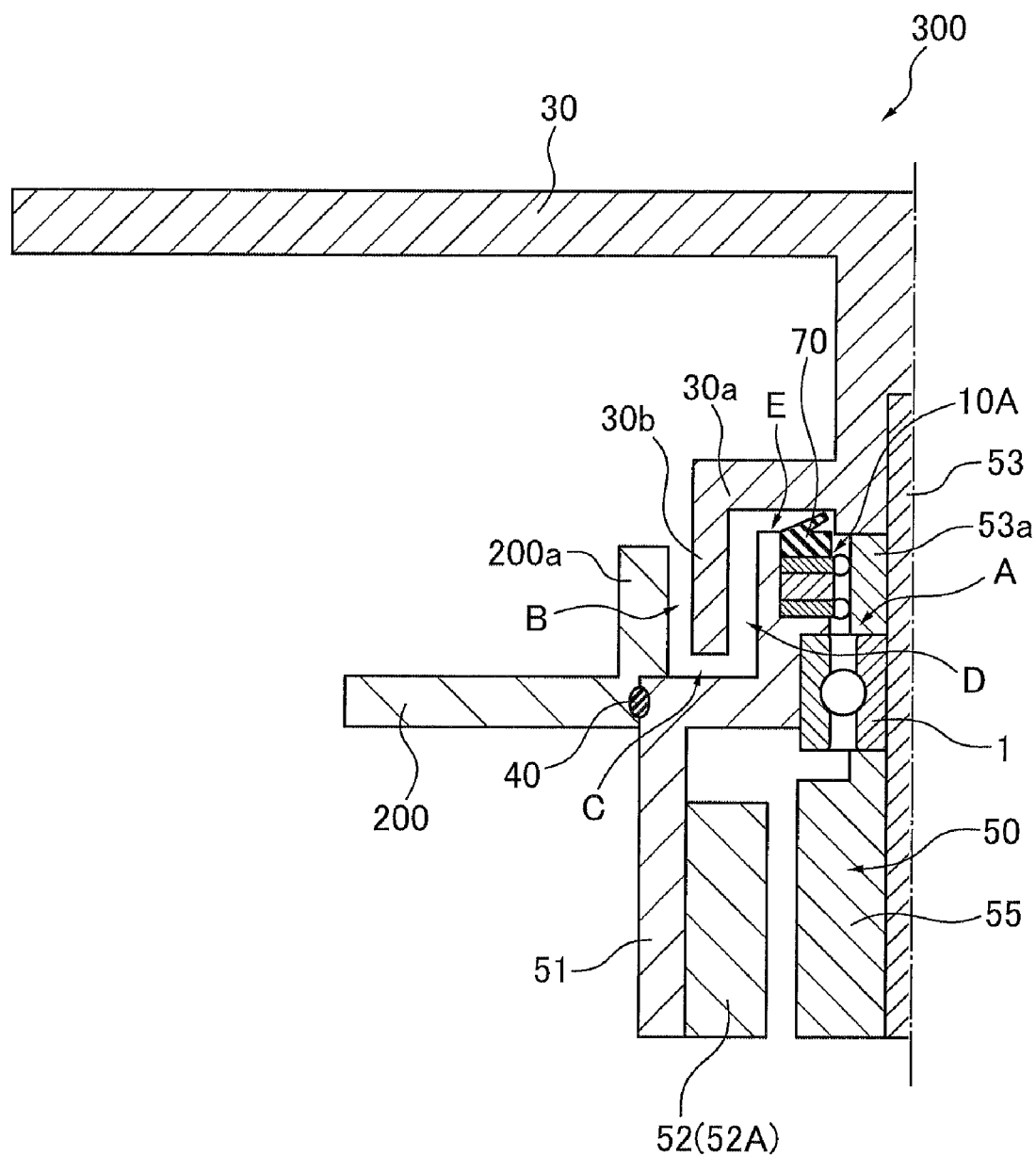
FIG. 9 is a schematic half sectional view of a fifth example of the drive portion having the propeller in the drone shown in FIG. 1.

FIG. 9 is a schematic half sectional view of a fifth example of the drive portion 300. As shown in the figure, the fifth example may have, in addition to the configuration of the third example, an elastic seal member 70 as still yet another form of foreign matter entry prevention unit. The elastic seal member 70 may be made of, for example, a rubber material and can be provided in any opposed portion. In this example, the elastic seal member 70 may be arranged in a vicinity of the fifth opposed portion E adjacently to the magnetic seal mechanism 10A and configured so that a lip portion at a distal end thereof comes in contact with the inner surface of the radially extending portion 30A of the propeller 30.

Similarly to the above-mentioned examples, the elastic seal member 70 described above can also effectively prevent foreign matter from entering the motor housing 51. Furthermore, in this example, the elastic seal member 70 may be positioned in the opposed portion without being exposed to outside, and thus ultraviolet-induced deterioration of the elastic seal member 70, even when made of a rubber material, can be suppressed. In this example, it may also be possible that the elastic seal member 70 is subjected to a water-repellent treatment. With such a water-repellent treatment applied, even when a minute gap is present in the opposed portion, a water beading action brought about by the water-repellent treatment can effectively suppress water entry thereinto, so that a water-proof property can be improved. Furthermore, a water-repellent effect may make it possible to permit a slight clearance to be left in the opposed portion, while achieving desired water-proof performance, and thus a reduction in torque loss can also be achieved by providing such a clearance.

Figure 10:
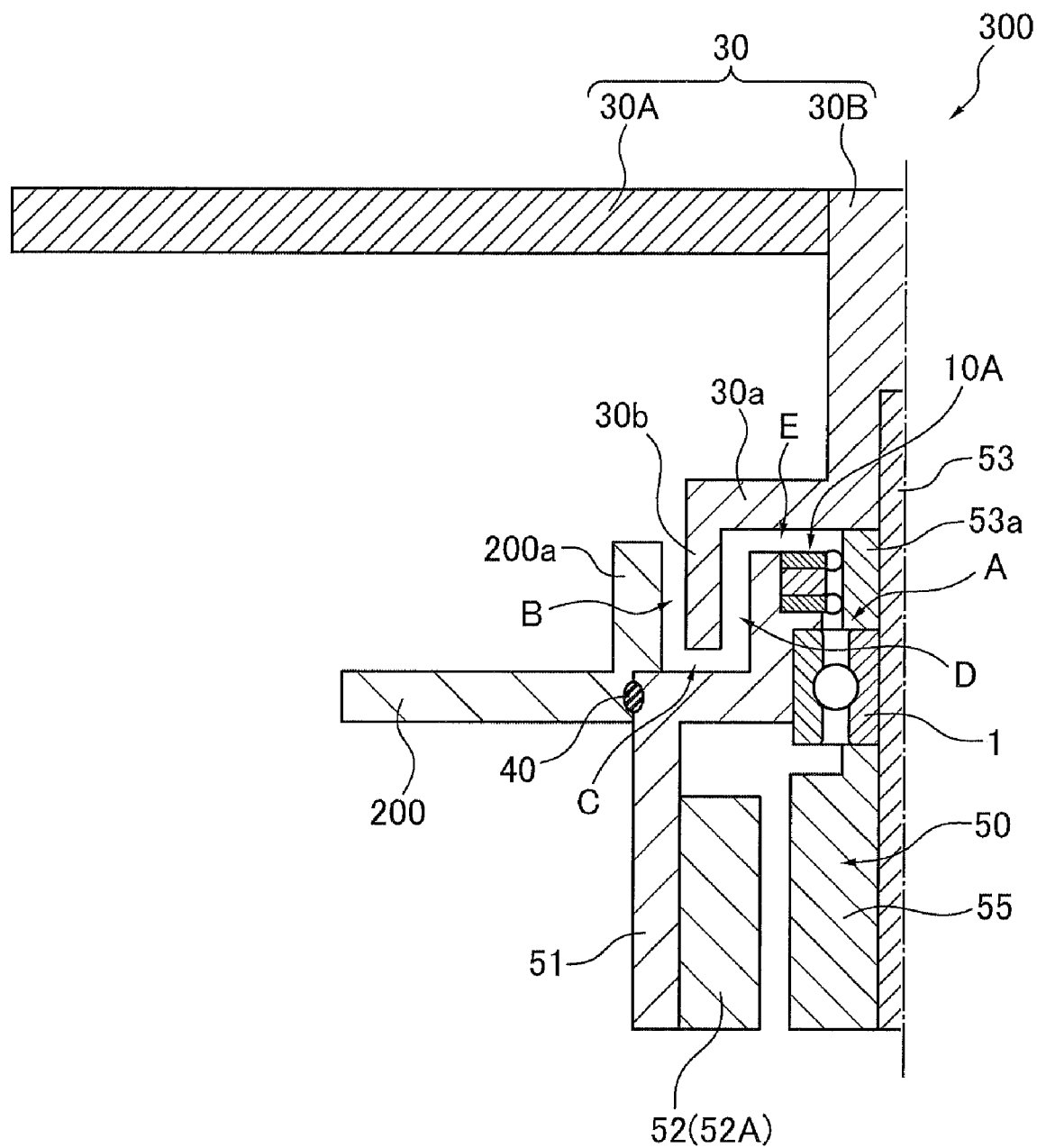
FIG. 10 is a schematic half sectional view of a sixth example of the drive portion having the propeller in the drone shown in FIG. 1.

FIG. 10 is a schematic half sectional view of a sixth example of the drive portion 300. As shown in the figure, the sixth example may have, in addition to the configuration of the third example, a configuration in which the propeller 30 has a blade portion 30A configured to rotate in a horizontal plane (in another embodiment, it may also be possible that the blade portion 30A rotates in a vertical plane) and a cover portion 30B (including the radially extending portion 30a and the axially extending portion 30b) provided separately from the blade portion 30A and opposed to the fixed-side component (in this example, the motor housing 51 and the frame portion 200).

Thus, according to this example, an effect (a foreign matter entry prevention effect) similar to that of the third example may be provided. Further, the propeller 30 may be composed of the blade portion 30A and the cover portion 30B, and the blade portion 30A and the cover portion 30B may be formed by using different materials from each other. This makes it possible to achieve weight reduction, ease in molding, and so on.

Figure 11:
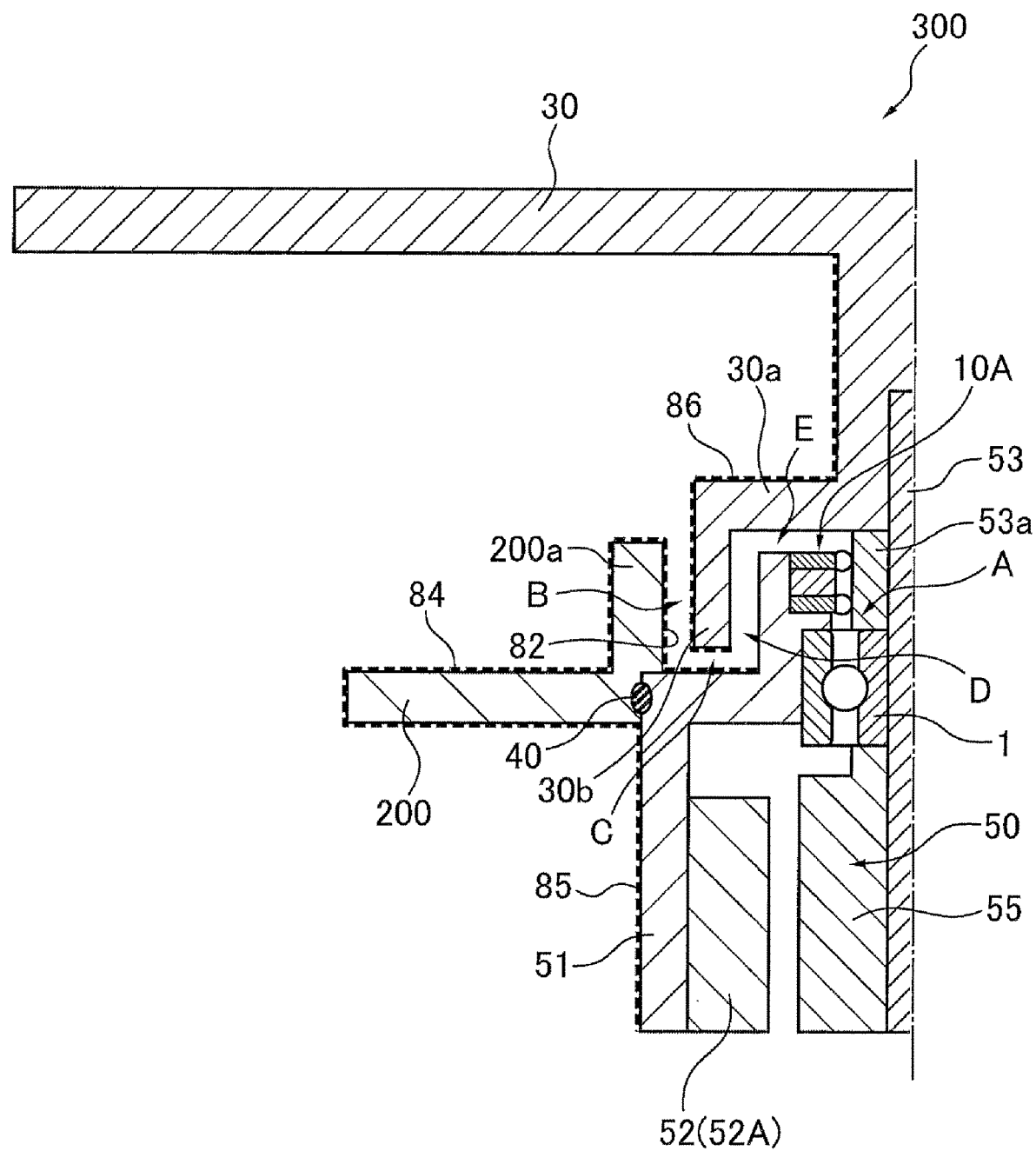
FIG. 11 is a schematic half sectional view of a seventh example of the drive portion having the propeller in the drone shown in FIG. 1.

FIG. 11 is a schematic half sectional view of a seventh example of the drive portion 300. As shown in the figure, the seventh example may have, in addition to the configuration of the third example, a configuration in which the fixed-side component and the rotary-side component, which form the opposed portion, are subjected to a water-repellent treatment. Specifically, on surfaces of the axially extending portion 30b of the propeller 30, which form the opposed portions B and C (form part of the labyrinth structure), a water-repellent treatment 86 (indicated by a thick broken line) may be applied by applying a water-repellent material including, for example, a fluorine resin or a silicon resin, and also on surfaces of an area of the frame portion 200 (the axially extending portion 20a) and an area of the motor housing 51, which form the opposed portions B and C (form part of the labyrinth structure), a water-repellent treatment 82 (indicated by a thick broken line) may be applied. Furthermore, also on surfaces of relevant areas of the propeller 30 (for example, an area thereof joined to the propeller shaft 53 and the radially extending portion 30a), the water-repellent treatment 86 (indicated by a thick broken line) may be applied. Moreover, also on an external surface of the frame portion 200 including the axially extending portion 200a, a water-repellent treatment 84 (indicated by a thick broken line) may be applied, and also on an external surface of the motor housing 51, a water-repellent treatment 85 (indicated by a thick broken line) may be applied. Or alternatively, it may also be possible that necessary areas are each made of a water-repellent material.

In a case where the water-repellent treatments 82, 84, 85, and 86 described above are applied, even when minute gaps may be present in the opposed portions, a water beading action brought about by the water-repellent treatments 82, 84, 85, and 86 can effectively suppress water entry thereinto, so that a water-proof property can be improved. Furthermore, a water-repellent effect may make it possible to permit a slight clearance to be left in the opposed portion, while achieving desired water-proof performance, and thus a reduction in torque loss can also be achieved by providing such a clearance.

Embodiments of the present invention are not limited to the above descriptions and are susceptible to various modifications. For example, the above-described structures of the drive portion and the drive motor (structures of the stator, the rotor, the housing, and so on) can be variously modified, and correspondingly therewith, the configuration and arrangement of the foreign matter entry prevention unit can be also modified as appropriate. Furthermore, in the present invention, any combination of the configurations shown in FIG. 3 and FIG. 6 to FIG. 11 can be implemented. Furthermore, while the foregoing embodiment uses the motor housing 51 housing the drive motor 50 therein as an example, the motor housing 51 can also be replaced with a housing that houses a motor and/or a speed reducer therein.

What is claimed is:

1. A drone including a drive portion having a propeller, the drive portion being attached to a body, the drone being configured to fly by driving a motor to rotate the propeller, the drone comprising:

a fixed section having a housing for housing therein the motor and/or a speed reducer;

a rotary section having a propeller shaft, the propeller shaft being supported via a bearing so as to be rotatable with respect to the housing, the rotary section being configured to rotate integrally with the propeller; and a foreign matter entry prevention unit configured to prevent foreign matter from entering an inside of the housing, the foreign matter entry prevention unit being mounted at a passage for entry of foreign matter into the housing in an opposed portion where fixed-side components constituting the fixed section and rotary-side components constituting the rotary section are opposed to each other.

2. The drone according to claim 1, wherein the foreign matter entry prevention unit is formed of a magnetic seal mechanism inserted in the opposed portion, a magnetic seal mechanism-equipped bearing, an elastic seal member inserted in the opposed portion, a labyrinth structure, or any combination thereof, the labyrinth structure being configured by alternately and continuously providing a plurality of the opposed portions in each of which the fixed-side components and the rotary-side components are opposed to each other in a radial direction of the drive portion, and a plurality of the opposed portions in each of which the fixed-side components and the rotary-side components are opposed to each other in an axial direction of the drive portion.

3. The drone according to claim 2, wherein the foreign matter entry prevention unit is formed of the elastic seal member inserted in the opposed portion, and the elastic seal member is subjected to a water-repellent treatment.

4. The drone according to claim 1, wherein the foreign matter entry prevention unit is formed of an airflow generation unit provided on the rotary-side components and configured to generate, as the propeller rotates, an airflow in the opposed portion, the airflow being directed in a direction reverse to an entry direction of foreign matter.

5. The drone according to claim 1, wherein the opposed portion is formed of the housing and the propeller opposed to each other or of the body and the propeller opposed to each other.

6. The drone according to claim 5, wherein the opposed portion is subjected to a water-repellent treatment.

7. The drone according to claim 1, wherein the propeller has a blade portion configured to rotate in a horizontal plane or a vertical plane and a cover portion provided separately from the blade portion and opposed to the fixed-side components.

8. The drone according to claim 1, wherein the fixed-side components and the rotary-side components are subjected to a water-repellent treatment, the fixed-side components and the rotary-side components forming the opposed portion.

9. The drone according to claim 1, wherein a seal member is inserted between the body and the housing.

* * * * *